United States Patent [19]
Cordier et al.

[11] Patent Number: 5,867,318
[45] Date of Patent: Feb. 2, 1999

[54] WIDE-ANGLE OPTICAL SYSTEM

[75] Inventors: Chantal Cordier, Le Kremlin Bicetre; Jean Lacuve, Athis-Mons, both of France

[73] Assignee: Sagem SA, Paris, France

[21] Appl. No.: 728,687

[22] Filed: Oct. 10, 1996

[30] Foreign Application Priority Data

Oct. 11, 1995 [FR] France .................................. 95 11910

[51] Int. Cl.$^6$ .............................. G02B 27/10; G02B 7/00; G02B 23/00
[52] U.S. Cl. ........................... 359/618; 359/419; 359/431; 359/504
[58] Field of Search ..................................... 359/362–366, 359/372–373, 376–378, 399–407, 431, 503–504, 462–467, 471–472, 478–482, 618–622, 636–640, 851–857; 348/128

[56] References Cited

U.S. PATENT DOCUMENTS

| | | | |
|---|---|---|---|
| 4,750,810 | 6/1988 | Tomlin et al. | 359/640 |
| 4,910,395 | 3/1990 | Frankel | 359/639 |
| 5,408,553 | 4/1995 | English, Jr. et al. | 359/636 |
| 5,557,475 | 9/1996 | Nightingale et al. | 359/831 |
| 5,581,409 | 12/1996 | Ruben | 359/636 |

FOREIGN PATENT DOCUMENTS 1727  11/1915  United Kingdom .................. 359/373

*Primary Examiner*—Thong Nguyen
*Attorney, Agent, or Firm*—Laubscher & Laubscher

[57] ABSTRACT

An optical system affords wide-angle imaging with a width in azimuth and a height in elevation respectively greater than and less than those of the field of view of an imaging device to which it is fitted. A median optical axis images a central format view on the optical axis of the imaging device, and two lateral optical paths image two lateral format views on a bearing axis at a bearing angle to the optical axis equal to the width in azimuth of the field of view of the imaging device. The three paths juxtaposed in the wide-angle field of view are superposed into a resultant format image.

8 Claims, 3 Drawing Sheets

WIDE-ANGLE OPTICAL SYSTEM

BACKGROUND OF THE INVENTION

1. Field of the Invention

The present invention concerns a wide-angle optical system that is capable of viewing areas that cannot be covered directly by the field of view of a conventional imaging device.

The invention relates more particularly to the field of area surveillance.

2. Description of the Prior Art

Most existing imaging devices provide an image of the area under surveillance, which is rectangular, with a width in azimuth and a height in elevation of similar magnitude, for example in a 4/3 ratio for the standard television format. Such an imaging device equipped with an objective of appropriate focal length monitors an area 40°×30°, for example.

It is increasingly necessary to monitor areas having a relatively greater angular width and a relatively smaller angular height, typically 120°×10°, that is to say a relatively wide azimuthal field compared to a relatively narrow field in elevation. For example, a very wide linear field is required in ballistics to identify a few points on the trajectory of the projectile or a mobile, or in security applications to monitor a long fence.

Conventional imaging devices are often of the solid state infrared detector type. The infrared detector comprises a matrix array of sensors each comprising a CCD (Charge-Coupled Device) charge transfer cell. These detectors generally operate in the band of wavelengths from 3 to 5 micrometers or in the band from 8 to 12 micrometers.

A first solution could consist in a new detector with a field covering directly the view to be imaged, typically 120°×10°. The development of a dedicated detector of this kind would be very costly.

Another solution would be to associate a detector known in itself with an anamorphic optical system. The pixels of the resulting image would then also be anamorphic and the resulting image would not be homogeneous in terms of the horizontal and vertical resolutions.

A third solution would be to juxtapose three standard detectors that would each cover one third of the azimuth field, i.e. 120°/3=40°. The cost of this latter solution would be prohibitive.

OBJECTS OF THE INVENTION

The main object of the present invention is to provide an optical system that can be fitted to an imaging device known in itself by means of which views having a field substantially wider than that covered by the imaging device can be imaged.

Another object of this invention is to provide such a wide-angle optical system having an additional cost less than that of the solutions mentioned above.

SUMMARY OF THE INVENTION

Accordingly an optical system images views with a wide-angle field having a predetermined azimuth width and a predetermined elevation height by means of an imaging device with an optical axis. The imaging device has a field with an azimuth width less than that of the wide-angle field and an elevation height greater than that of the wide-angle field. The optical system comprising:

first optical means for imaging views directly on the optical axis of the imaging device, and second optical means for imaging views along a bearing axis at a bearing angle to the optical axis at most equal to the azimuth width of the field of the imaging device, the first optical means and second optical means respectively covering substantially juxtaposed fields in the wide-angle field and each having an azimuth width substantially equal to the bearing angle and an elevation height not greater than half the elevation height of the field of the imaging device.

In order for the sensitive face of the imaging device, such as a video camera or a photographic camera, to receive simultaneously and frame the views imaged by the first optical means and second optical means, the second optical means comprise deflector means for deflecting an incident light beam at the bearing angle towards a direction parallel to the optical axis of the imaging device and passing through an objective common to the first and second optical means. When the incident light beam is along the parallel direction, it passes through an objective common to the first optical means and second optical means. This common objective is also passed through another incident optical beam representative of views imaged on the optical axis of the imaging device.

In a first embodiment of the invention, the deflector means diverts the incident light beam along a broken line. In this first embodiment, the deflector means can comprise a prism for deflecting the incident light beam along an optical axis of an entry objective parallel to the optical axis of the imaging device, and two parallel reflector means to deflect a light beam emerging from the prism through the entry objective, firstly perpendicularly and subsequently parallel to the optical axis of the imaging device. The first and second optical means have an intermediate image plane that is common to the entry objective in the deflector means and to an entry objective in the first optical means situated on the optical axis of the imaging device in front of the common objective.

Preferably, the prism has a first face perpendicular to the bearing axis, a reflective second face at an angle to the optical axis of the entry objective of the deflector means complementary to half the bearing angle and a semi-reflective face perpendicular to the optical axis of the entry objective of the deflector means.

In a second embodiment of the invention, the deflector means deflects the incident light beam along a curvilinear path.

In this second embodiment, the deflector means comprises a bundle of optical fibers having an entrance face perpendicular to the bearing axis and an emergent face. The emergent face is located in an intermediate image plane perpendicular to the optical axis of the imaging device, is near the optical axis and faces the common objective. An entry objective has the bearing axis as an optical axis and has an image focal plane substantially coincident with the entrance face of the bundle of optical fibers.

When the field to be monitored is very wide, the optical system can comprise a third optical means analogous to the second optical means and symmetrical thereto about the optical axis of the imaging device to image views along a bearing axis at a bearing angle opposite to the bearing angle relating to the second optical means, so that the views imaged by the second and third optical means are respectively above and below the views imaged by the first optical means in the imaging device.

BRIEF DESCRIPTION OF THE DRAWINGS

Further features and advantages of the invention will be apparent from the following particular description of several preferred embodiments of the invention as illustrated in the corresponding accompanying drawings in which.

DESCRIPTION OF THE PREFERRED EMBODIMENTS

Figure 1A:
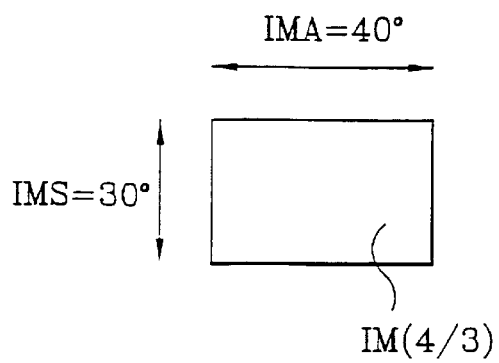
FIGS. 1A, 1B, 1C and 1D respectively show a standard image format or field imaged by a conventional imaging device, a field to be monitored, the field to be monitored divided into three strips and the three strips juxtaposed in the standard format, to explain the operation of an optical system of the invention.

Referring to FIG. 1A, an image IM formed by a conventional imaging device DP has a format IMA/IMS=4/3. The longer sides of the format correspond to a first field direction, called as the azimuth field, having a width IMA of 40°. The shorter sides of the format correspond to a second field direction, called as the elevation field, having a height IMS of 30°.

Figure 1B:
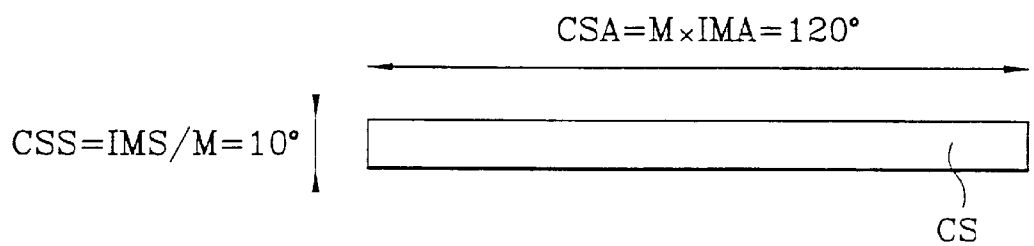

FIG. 1B shows the small rectangular base of a pyramidal field CS to be monitored by the imaging device DP associated with an optical system of the invention. The field CS has an azimuth width CSA=M×IMA where M is a number typically equal to 3, i.e. an azimuth width CSA of 120°. The elevation height CSS of the field CS is in a ratio IMS/CSS=M to the height IMS, i.e. an elevation height CSS of 10°.

Figure 1C:
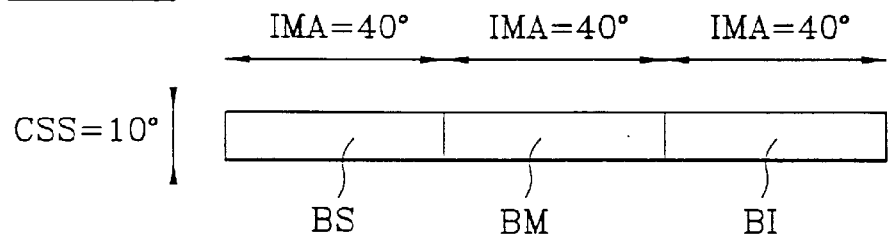

In accordance with the invention, the monitored field CS is divided into M=3 strips BS, BN and BI juxtaposed in the direction of the width CSA of the field to be monitored, as shown in FIG. 1C, so that each strip has an azimuth width CSA/M equal to the azimuth width IMA of the format of images formed directly by the imaging device. The elevation height of the strips is equal to the height CSS of the field to be monitored and less than that IMS of the standard image format.

Figure 1D:
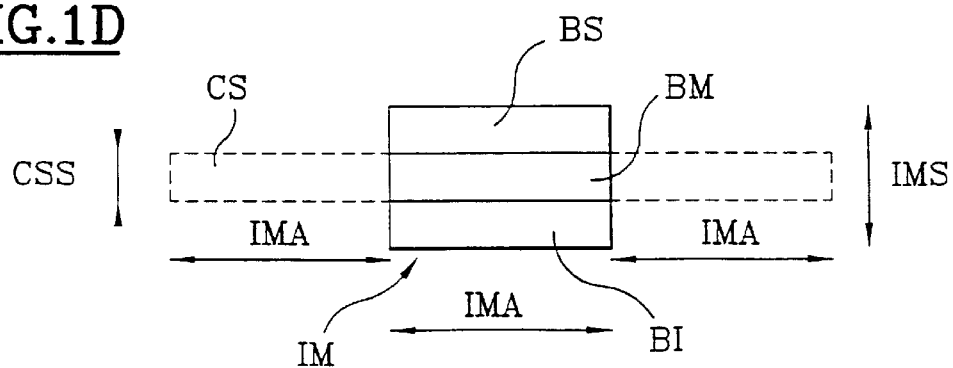

The optical system according to the invention simultaneously forms three views corresponding to the three strips BS, BM and BI and combines them optically into the standard IMA×IMS image format, as shown diagrammatically in FIG. 1D. The strip BS on the left of the monitored field CS monitored is translated on top of the middle strip BM and thus into the top part of the standard IM format. The strip BI on the right in the monitored field CS is translated below the middle strip BM and thus into the bottom part of the standard IM format. The sum of the elevation heights of the three strips superposed vertically in this way is at most equal to the elevation height IMS of the standard format, the azimuth width of each strip being no greater than that IMA of the standard format.

Figure 2:
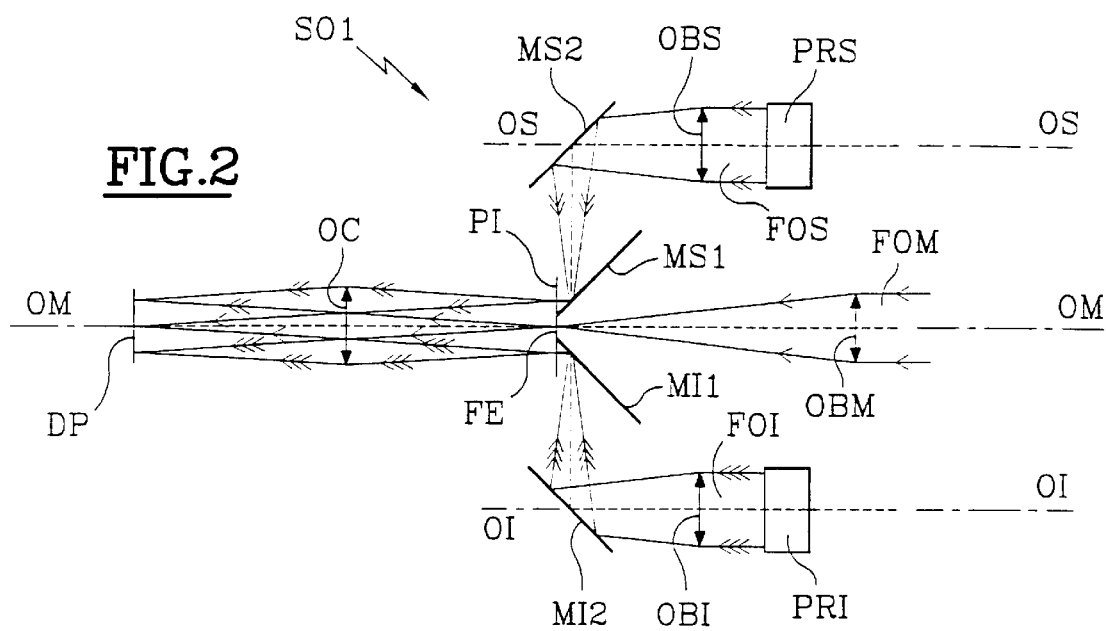
FIG. 2 is a diagrammatic vertical side view of an optical system with mirrors and prisms according to a first embodiment of the invention.

In a first embodiment shown in FIG. 2, an optical system SO1 has three optical paths, a middle optical path and top and bottom optical paths symmetrical about the middle path.

The rectilinear middle optical path is defined by the optical axis OM—OM of the imaging device DP.

Figure 4:
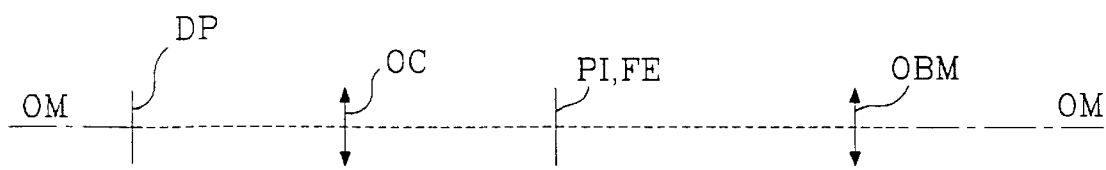
Figure 5:
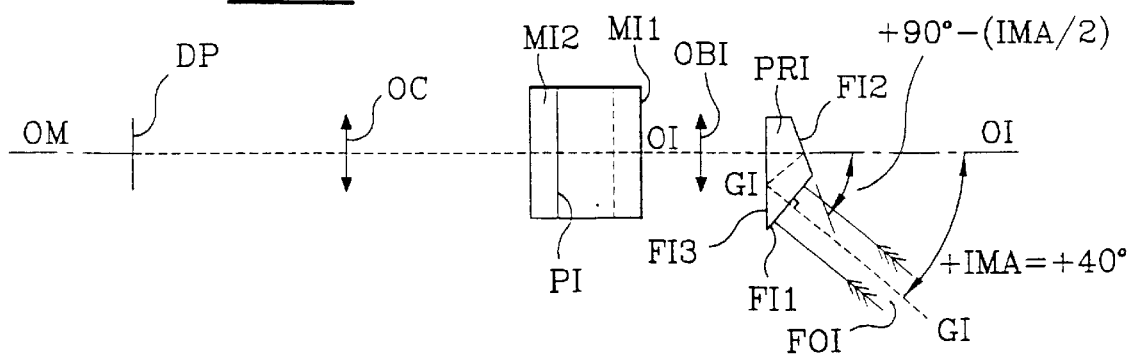
Figure 6:
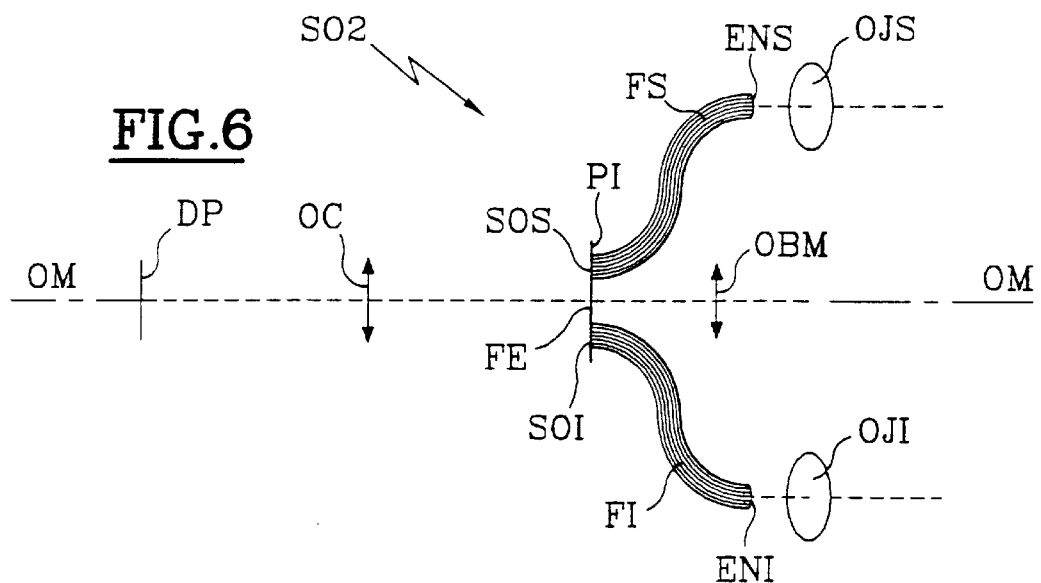
FIG. 6 is a diagrammatic vertical side view of an optical system with bundles of optical fibers according to a second embodiment of the invention.

Starting from the imaging device DP, such as a solid state infrared detector, the middle optical path shown in FIGS. 2 and 4 comprises an objective OC of 1/1 magnification common to the three optical paths and an entry objective OBM. The entry objective is located in front of the objective OC and covers a field IMA×IMS, i.e. an azimuth width IMA=40° and an elevation height IMS=30°, in a similar manner to the objective originally fitted to the imaging device DP. Between the objectives OC and OBM there are two first mirrors MS1 and MI1 disposed symmetrically at 45° to the middle path optical axis OM—OM to reflect the elevation 1/Mth=1/3 of downward and upward optical beams towards top and bottom portions of the objective OC. The near ends of the mirrors MS1 and MI1 are in the image focal plane PI of the entry objective OBM which is situated between the objectives OBM and OC and which is symmetrical to the image focal plane of the common objective OC about the latter plane, where the matrix of sensors in the device DP is located. Between the near sides of the mirrors MS1 and MI1 is provided a central slot FE having a width equal to IMA/CSS=4 times its height to transmit the elevation middle 1/Mth=1/3 of an incident optical beam FOM representative of the middle strip BM from the objective OBM towards the central third of the objective OC. The entry objective OBM can be a conventional 4/3 format objective with top and bottom masks so that it transmits only one third 1/M=1/3 of the field of view.

The two mirrors MS1 and MI1 materialize the convergence of the top and bottom optical paths towards the middle optical path.

Figure 3:
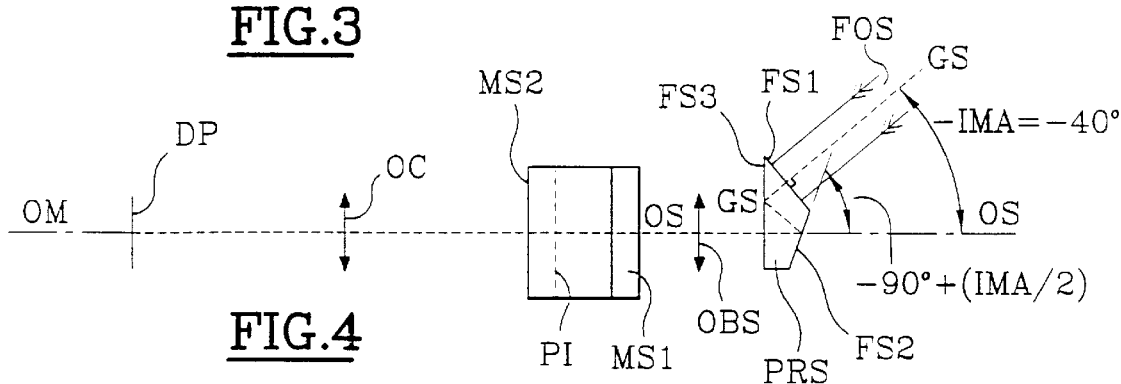
FIGS. 3, 4 and 5 are respectively plan views of a top optical path, a middle optical path and a bottom optical path in the first embodiment of the optical system shown in FIG. 2.

As shown in FIGS. 2 and 3 the top optical path includes, starting from the imaging device DP, in addition to the common objective OC and the first mirror MS1, a second mirror MS2, an entry objective OBS and a prism PRS that are aligned along an optical axis OS—OS which is parallel to the middle path optical axis OM—OM and vertically above the latter. The mirror MS2 is parallel to and faces the first mirror MS1 but the central third of its surface faces the bottom third of the surface of the first mirror MS1 to transmit only an optical beam with the 40°/10°=4/1 format into the top third of the objective OC.

The prism PRS has a first face FS1 oriented laterally to the left along a bearing axis GS—GS at an angle of –IMA=–40° to the optical axis OS—OS. A second reflective face FS2 is adjacent the face FS1 and with the latter faces outwards, in the opposite direction to the entry objective OBS, and with the optical axis OS—OS forms an angle of 90°–(IMA/2)= 70°. A third semi-reflective face FS3 of the prism PRS is perpendicular to the optical axis OS—OS, facing towards the entry objective OBS. The entry objective OBS focuses views in the top optical path. In front of the face FS1, the entry objective OBS covers a field having, like that covered by the middle path objective OBM, an azimuth width of approximately 40° and an elevation height of approximately 10°, at a bearing angle of –IMA=–40° to the parallel optical axes OS—OS and OM—OM in order to cover the field corresponding to the strip BS situated on the left in the monitored field CS.

A left top incident light beam FOS corresponding to the strip BS and passing perpendicularly through the first face FS1 is totally reflected by the semi-reflective face FS3 inside the prism PRS. The light beam is then totally reflected by the face FS2 to form a beam emerging along the optical axis OS—OS. The prism PRS thus constitutes means for deflecting in bearing the main optical axis of the device DP. The emergent beam passes through the entry objective OBS, is reflected in a vertical direction by the second mirror MS2 and is finally reflected parallel to the middle path axis OM—OM by the first mirror MS1, towards the top third of the common objective OC of the imaging device DP. As with the entry objective OBM, the intermediate image plane PI is the image plane of the entry objective OBS as reflected by the mirrors MS2 and MS1.

The bottom optical path is symmetrical to the top optical path about the middle path optical axis OM—OM, and includes a prism PRI the orientation of which is symmetrical to that of the prism PRS about a vertical plane materialized by the plane of FIG. 2. The bottom optical path covers a field corresponding to the strip BI situated on the right in the monitored field CS, i.e. on a bearing axis GI—GI at a bearing angle IMA=+40° to the axis OM—OM, this bearing angle being opposite the bearing angle of −40° in the top optical path. The bottom optical path also includes along an optical axis OI—OI a second mirror MI2 and an entry objective OBI respectively symmetrical to the mirror MS2 and to the entry objective OBS about the optical axis OM—OM.

The prism PRI has a first face FI1 symmetrical to the face FS1, i.e. at a bearing angle IMA=+40° to the optical axis OI—OI, a second reflective face FI2 at an angle 90°−(IMA/2)=70° to the optical axis OI—OI, and a semi-reflective third face FI3 perpendicular to the optical axis OI—OI and facing towards the entry objective OBI. An incident light beam FOI from the bearing direction at +40° is deflected onto the optical axis OI—OI in the prism FI2 by total reflection twice, at the third face FI3 and then at the second face FI2. The beam then passes through the bottom entry objective OBI, is reflected by the mirror MI2, and is finally reflected by the mirror MI1 towards the bottom third of the common objective OC of the imaging device DP, parallel to the middle path optical axis OM—OM.

In a more compact variant, each pair of parallel mirrors MS1 and MS2, MI1 and MI2 is replaced by a prism having two facing parallel reflective faces. In practice the optical system is the size of a box of matches.

In a second embodiment of the invention shown in FIGS. 6, 7, 8 and 9, an optical system SO2 also comprises a middle optical path, a top optical path having a bearing axis GS—GS and a bottom optical path having a bearing axis GI—GI. As in the first embodiment, the middle optical path includes along an optical axis OM—OM coincident with the optical axis of the imaging device DP a common objective OC, a ⅓ format slot FE in an intermediate image plane PI and an outwardly facing entry objective OBM. The top and bottom optical paths are again symmetrical about the middle path optical axis OM—OM.

In each of the top and bottom paths of the optical system SO2 a bundle of optical fibers FS, FI replaces the combination of the mirror MS1, MI1, the mirror MS2, MI2 and the prism PRS, PRI in the first optical system SO1. Each optical fiber in the bundle preferably corresponds to one pixel in the image plane in the device DP, i.e. one CCD cell of the matrix detector, which improves the resolution of the optical system.

Figure 7:
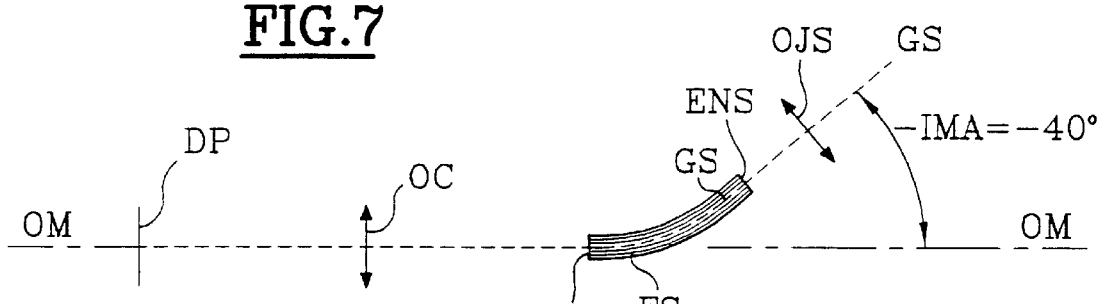
FIGS. 7, 8 and 9 are respectively plan views of a top optical path, a middle optical path and a bottom optical path in the second embodiment of the optical system shown in FIG. 5.
Figure 8:
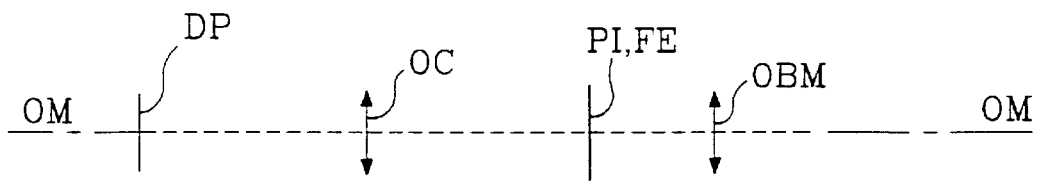
Figure 9:
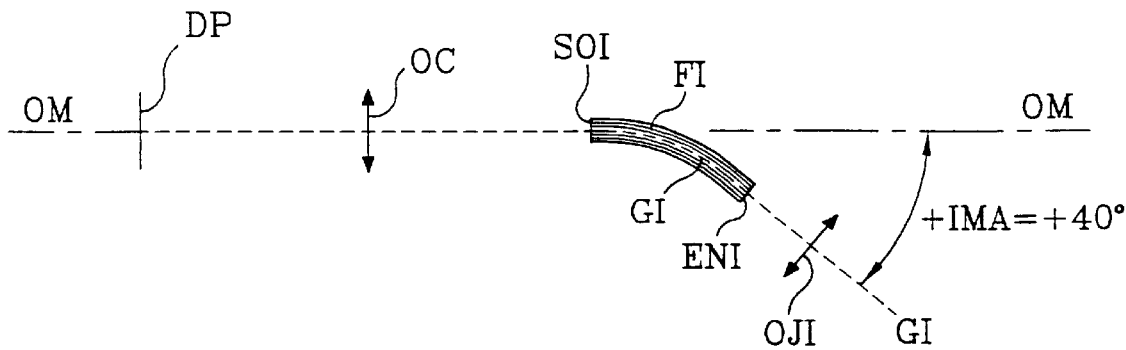

An entrance face ENS, ENI of the bundle of optical fibers FS, FI is directed at the respective bearing angle −IMA=−40°, +IMA=+40° towards an entry objective OJS, OJI having a function equivalent to that of the entry objective OBS, OBI. In other words, the direction GS—GS, GI—GI of the entrance face ENS, ENI is at a respective bearing angle of +40°, −40° to the middle path optical axis OM—OM of a horizontal plane, as shown in FIGS. 7, 9. The image focal plane of the objective OJS, OJI is substantially in the plane of the entrance face ENS, ENI of the bundle of optical fibers FS, FI which transfers this image focal plane into the intermediate plane PI. The other face, called as an emergent face, SOS, SOI of the bundle of optical fibers FS, FI is located in the image plane PI common to the three optical paths. The bundle of optical fibers FS, FI is therefore developed into a twisted S-shape.

In front of the objective OC of the imaging device, the entry objective OBM transmits a light beam passing between the optical fiber bundle emergent ends SOS and SOI in order to transmit a ⅓ format image corresponding to the middle field strip BM in the monitored field CS. The ends SOS and SOI parallel transmit light beams corresponding to the ⅓ format strips BS and BI on the left and on the right in the monitored field CS. As in the first embodiment, after independent focusing by means of the entry objectives OJS, OBM and OSI and final focusing by the common objective OC, the images transmitted by the three light beams towards the common objective OC are superposed vertically from the image plane PI common to the optical fiber bundle ends SOS and SOI, each image occupying one $\frac{1}{M}$th=⅓ of the elevation height IMS of the resulting image, as shown in FIG. 1D.

Although the embodiments described above divide a monitored field CS into three strips BS, BM and BI, the invention also concerns a monitored field divided into two strips such as BM and BS. Each of said two strips has an azimuth width not greater than that IMA of the field originally covered by the device DP, i.e. not greater than the bearing angle between the axis GS—GS and the optical axis OM—OM. The elevation height of each of said two strips and therefore of the monitored field is then not greater than half the elevation height IMS of the field covered by the device DP.

Resultant image formats other than the ⅔ rectangular image format IM may be chosen. If the imaging device is a standard infrared video camera having a square matrix array of 256×256 CCD sensors, and therefore a 1/1 format, for example, the square format is divided into three superposed rectangular strips. Each strip covers a field having an azimuth width of 40° and an elevation height of 40°/3=13.3°.

More generally, to cover a very wide field with any azimuth aperture CSA, K pairs of top and bottom optical paths of the first or second embodiment type are provided to monitor respective fields having an azimuth width IMA= CSA/M in bearing directions of ±(K.IMA) relative to the middle path optical axis OM—OM, where K is an integer greater than 1 such that M=2K+1 and IMA is a standard field width. The elevation height of the strip covered by each optical path may be between 10° and 45°, approximately. For example, with a very wide-angle field, the resulting image can show the launch point and the apogee, and even the point of impact of a projectile, or the ends of a long fence to be monitored.

To facilitate the reading of the images on a screen, the image strips BS, BM and BI may be processed digitally to represent images juxtaposed horizontally rather than superposed. This processing may additionally eliminate areas of overlap at the boundaries of the strips, both horizontally and vertically, and correct aberration of the objectives.

What is claimed is:

1. An optical system for imaging views with a wide-angle field having predetermined azimuth width and a predetermined elevation height by means of an imaging device (DP) with an optical axis (OM), said imaging device having a field with an azimuth width less than said predetermined azimuth width of the wide-angle field and an elevation height greater than said predetermined elevation height of the wide-angle field, said optical system comprising:

(a) first optical means (OBM) for imaging views directly on the optical axis of said imaging device, and (b) second optical means for imaging views along a bearing axis (GS;GI) at a bearing angle (−IMA, +IMA) to said optical axis at most equal to said azimuth width of said field of said imaging device, (c) said first optical means and second optical means respectively covering substantially juxtaposed fields in said wide-angle field and each having an azimuth width substantially equal to said bearing angle and an elevation height not greater than half of said elevation height of said field of said imaging device.

2. The optical system claimed in claim 1, wherein said second optical means comprises deflector means for deflecting an incident light beam (FOS;FOI) at said bearing angle toward a direction parallel to said optical axis of said imaging device and passing through an objective (OC) common to said first and second optical means.

3. The optical system claimed in claim 2, wherein said deflector means diverts said incident light beam (FOS;FOI) toward said common objective along a succession of angularly arranged paths (GS—GS; OS—OS; MS2, MS1).

4. The optical system claimed in claim 2 wherein said deflector means deflects said incident light beam along a curvilinear path.

5. The optical system claimed in claim 2 wherein said deflector means comprises a bundle of optical fibers having an entrance face perpendicular to said bearing axis and an emergent face which is located in an intermediate image plane perpendicular to said optical axis of said imaging device, is near said optical axis and faces said common objective, and an entry objective, the optical axis of which is said bearing axis and having an image focal plane substantially coincident with said entrance face of said bundle of optical fibers.

6. An optical system as defined in claim 2, wherein said deflector means comprises an entry objective (OBS;OBI), a prism (PRS;PRI) for deflecting said incident light into a first light beam along an optical axis (OS—OS;OI—OI) of said entry objective parallel to said optical axis of said imaging device, first reflector means (MS2;MI2) for deflecting said first light beam emerging from said prism into a second light beam perpendicular to said imaging device optical axis (OM), and second reflector means (MS1; MI1) for deflecting said second light beam into a third light beam which is parallel with said optical axis (OM) and which extends to said imaging device via said common objective;

(d) said first and second optical means having an intermediate image plane (PI) that is common with the reflected image transmitted via the entry objective (OBS;OBI) of said second optical means and the direct image transmitted via an entry objective (OBM) of said first optical means, whereby said third light beam is juxtaposed vertically relative to the light beam transmitted via the entry objective of said first optical system.

7. The optical system claimed in claim 6, wherein said prism has a first face (FS1; FI1) perpendicular to said bearing axis, a reflective second face (FS2;FI2) at an angle to said optical axis of said entry objective of said deflector means complementary to half said bearing angle, and a semi-reflective face (FS3;FI3) perpendicular to said optical axis (OS) of said entry objective of said deflector means.

8. An optical system as claimed in claim 1 comprising third optical means analogous to said second optical means and symmetrical thereto about said optical axis of said imaging device to image views along a bearing axis at a bearing angle opposite to said bearing angle relating to said second optical means.

* * * * *